US008639538B2

(12) United States Patent
Elsasser

(10) Patent No.: US 8,639,538 B2
(45) Date of Patent: Jan. 28, 2014

(54) METHODS AND APPARATUS FOR CALCULATING OPTIMAL SOCIAL SECURITY ELECTION DECISIONS

(75) Inventor: Joseph Elsasser, Omaha, NE (US)

(73) Assignee: Senior Market Sales, Inc., Omaha, NE (US)

( * ) Notice: Subject to any disclaimer, the term of this patent is extended or adjusted under 35 U.S.C. 154(b) by 47 days.

(21) Appl. No.: 13/310,120

(22) Filed: Dec. 2, 2011

(65) Prior Publication Data

US 2012/0143632 A1 Jun. 7, 2012

Related U.S. Application Data

(60) Provisional application No. 61/418,933, filed on Dec. 2, 2010.

(51) Int. Cl.
*G06Q 40/00* (2012.01)
*G06Q 40/08* (2012.01)

(52) U.S. Cl.
CPC .................................. *G06Q 40/08* (2013.01)
USPC .............................................................. 705/4

(58) Field of Classification Search
CPC .................................................... G06Q 40/08
See application file for complete search history.

(56) References Cited

U.S. PATENT DOCUMENTS

| 2,673,035 | A | 3/1954 | McTeer | |
|---|---|---|---|---|
| 6,611,807 | B1 * | 8/2003 | Bernheim et al. | 705/36 R |
| 8,301,526 | B2 * | 10/2012 | Mahaney et al. | 705/35 |
| 2004/0111291 | A1 * | 6/2004 | Dust et al. | 705/2 |
| 2004/0158517 | A1 * | 8/2004 | Mahaney et al. | 705/36 |
| 2009/0281959 | A1 * | 11/2009 | Abidi et al. | 705/36 R |
| 2011/0099123 | A1 * | 4/2011 | Nichols et al. | 705/36 R |

OTHER PUBLICATIONS

Mahaney et al., "Rethinking Social Security Claiming in a 401(k) World," PRCWP 2007-18 Pension Research Council Working paper, Aug. 2007, 42 pgs.
Meyer et al., "Social Security: When to Start Benefits and How to Minimize Longevity Risk," Journal of Financial Planning, vol. 23, No. 3, (Mar. 2010), 15 pgs.
"Benefit Calculator, Social Security Benefit Calculator Description," retrieved from the Internet Dec. 1, 2011, http://www.ssa.gov/oact/anypia/description.html, 4 pgs.
"SSCalc.net, Social Security calculator: retirement options for you and spouse," retrieved from the Internet Dec. 1, 2011, http://www.sscalc.net/, 2 pgs.

* cited by examiner

*Primary Examiner* — Bruce I Ebersman
(74) *Attorney, Agent, or Firm* — Cooley LLP

(57) ABSTRACT

In some embodiments, a non-transitory processor-readable medium stores code representing instructions to cause a processor to receive, from a user, an input of at least one value associated with financial information of a married couple, and calculate, using the at least one value, an average indexed monthly earnings (AIME) value and a primary insurance amount (PIA) value for each individual from the married couple. The code represents instructions to cause the processor to calculate, using the AIME value or the PIA value for each individual from the married couple, a set of Social Security election outcomes using each election strategy from a set of election strategies for each age combination from a set of age combinations for the married couple. The code further represents instructions to cause the processor to present the set of Social Security election outcomes to the user.

23 Claims, 6 Drawing Sheets

|  | High Wage Earner | Spouse |
|---|---|---|
| Name | Dick | Jane |
| Date of Birth | 12/21/1949 | 9/12/1949 |
| Gender | Male | Female |
| Life Expectancy | 80 Years 11 Months | 88 Years 11 Months |
| Life Expectancy Adjustment | 0 | 5 |
| Assumed Inflation | 2.80 % | |
| Real Rate of Return | 1.80 % | |
| Full Retirement Age | 66 Years 0 Months | 66 Years 0 Months |

310

| Age | Dick | Jane |
|---|---|---|
| 62 | $1,755.75 | $1,044.00 |
| 63 | $1,925.24 | $1,144.78 |
| 64 | $2,144.07 | $1,274.90 |
| 65 | $2,373.65 | $1,411.42 |
| 66 | $2,614.41 | $1,554.58 |
| 67 | $2,902.62 | $1,725.95 |
| 68 | $3,204.93 | $1,905.71 |
| 69 | $3,521.88 | $2,094.17 |
| 70 | $3,854.08 | $2,291.70 |

| Patrick's Election Age | Carolyn's Election Age | | | | | | | | |
|---|---|---|---|---|---|---|---|---|---|
| | 62 | 63 | 64 | 65 | 66 | 67 | 68 | 69 | 70 |
| 62 | $579,283 | $580,778 | $584,604 | $587,032 | $588,072 | $600,602 | $611,347 | $620,364 | $627,655 |
| 63 | $583,788 | $585,284 | $589,109 | $591,537 | $592,577 | $605,107 | $615,852 | $624,869 | $632,160 |
| 64 | $596,337 | $597,833 | $601,659 | $604,086 | $605,127 | $617,656 | $628,402 | $637,418 | $644,709 |
| 65 | $607,942 | $609,438 | $613,264 | $615,691 | $616,732 | $629,261 | $640,007 | $649,023 | $656,314 |
| 66 | $616,939 | $618,434 | $622,260 | $624,687 | $625,728 | $638,258 | $649,003 | $658,019 | $665,310 |
| 67 | $635,015 | $636,511 | $640,336 | $642,764 | $643,805 | $650,388 | $661,133 | $670,149 | $677,440 |
| 68 | $649,892 | $651,388 | $655,213 | $657,641 | $658,681 | $660,588 | $670,176 | $679,192 | $686,483 |
| 69 | $661,648 | $663,144 | $666,969 | $669,397 | $664,685 | $666,592 | $676,179 | $685,196 | $692,487 |
| 70 | $670,426 | $671,922 | $675,747 | $672,535 | $667,824 | $669,730 | $679,318 | $688,335 | $695,625 |

┌─────────────────────────────────────────────┐
│ Receive, from a user, an input value associated with financial │
│ information of a married couple. │
│ 502 │
└─────────────────────────────────────────────┘
                     ↓
┌─────────────────────────────────────────────┐
│ Calculate, using the input value, an AIME value and a PIA │
│ value for each individual from the married couple. │
│ 504 │
└─────────────────────────────────────────────┘
                     ↓
┌─────────────────────────────────────────────┐
│ Identify, from a set of election strategies, election strategies │
│ that are available for the married couple. │
│ 506 │
└─────────────────────────────────────────────┘
                     ↓
┌─────────────────────────────────────────────┐
│ Calculate, using the AIME value and the PIA value for each │
│ individual from the married couple, a set of Social Security │
│ election outcomes using each available election strategy from │
│ the set of election strategies for each age combination from a │
│ set of age combinations for the married couple. │
│ 508 │
└─────────────────────────────────────────────┘
                     ↓
┌─────────────────────────────────────────────┐
│ Present the set of Social Security election outcomes to the │
│ user. │
│ 510 │
└─────────────────────────────────────────────┘

FIG. 5

METHODS AND APPARATUS FOR CALCULATING OPTIMAL SOCIAL SECURITY ELECTION DECISIONS

CROSS-REFERENCE TO RELATED APPLICATION

This application claims priority to and the benefit of U.S. Provisional Patent Application No. 61/418,933, filed Dec. 2, 2010, and entitled "Methods and Apparatus for Calculating Optimal Social Security Election Decisions," which is incorporated herein by reference in its entirety.

BACKGROUND

Embodiments described herein relate generally to systems for calculating estimated Social Security benefits, and more particularly, to methods and apparatus for determining optimal Social Security election decisions for married couples.

Some known Social Security calculators calculate estimated Social Security benefits for single users. These Social Security calculators typically apply a "break-even" analysis to make a decision for when to elect Social Security for a user. Such Social Security calculators, however, operate only on election strategies designed for single users, and do not provide the user with election strategies available to married couples.

Some other known financial planning software tools can analyze the impact of different Social Security benefit elections for married couples. Such known software tools, however, typically analyze the elections on a scenario by scenario basis, in which a user inputs a set of election ages for a married couple and the program calculates the result of those election ages for the married couple. As such, these software tools do not provide a "landscape" view of possible options and strategies for electing Social Security.

Accordingly, a need exists for methods and apparatus that calculate and compare the Social Security election results across various election strategies and for all combinations of election ages for a married couple, thus to determine the best Social Security election strategy for the unique circumstances of the married couple.

SUMMARY

In some embodiments, a non-transitory processor-readable medium stores code representing instructions to cause a processor to receive, from a user, an input of at least one value associated with financial information of a married couple, and calculate, using the at least one value, an average indexed monthly earnings (AIME) value and a primary insurance amount (PIA) value for each individual from the married couple. The code represents instructions to cause the processor to calculate, using the AIME value or the PIA value for each individual from the married couple, a set of Social Security election outcomes using each election strategy from a set of election strategies for each age combination from a set of age combinations for the married couple. The code further represents instructions to cause the processor to present the set of Social Security election outcomes to the user.

BRIEF DESCRIPTION OF THE DRAWINGS

FIG. 3 illustrates assumptions and projected Social Security election benefits for a married couple, according to an embodiment.

FIG. 4 is a selectable user-interface illustrating the optimal results for each combination of election ages across election strategies for a married couple, according to an embodiment.

FIG. 5 is a flow chart illustrating a method of performing a Social Security optimization analysis, according to an embodiment.

DETAILED DESCRIPTION

Figure 1:
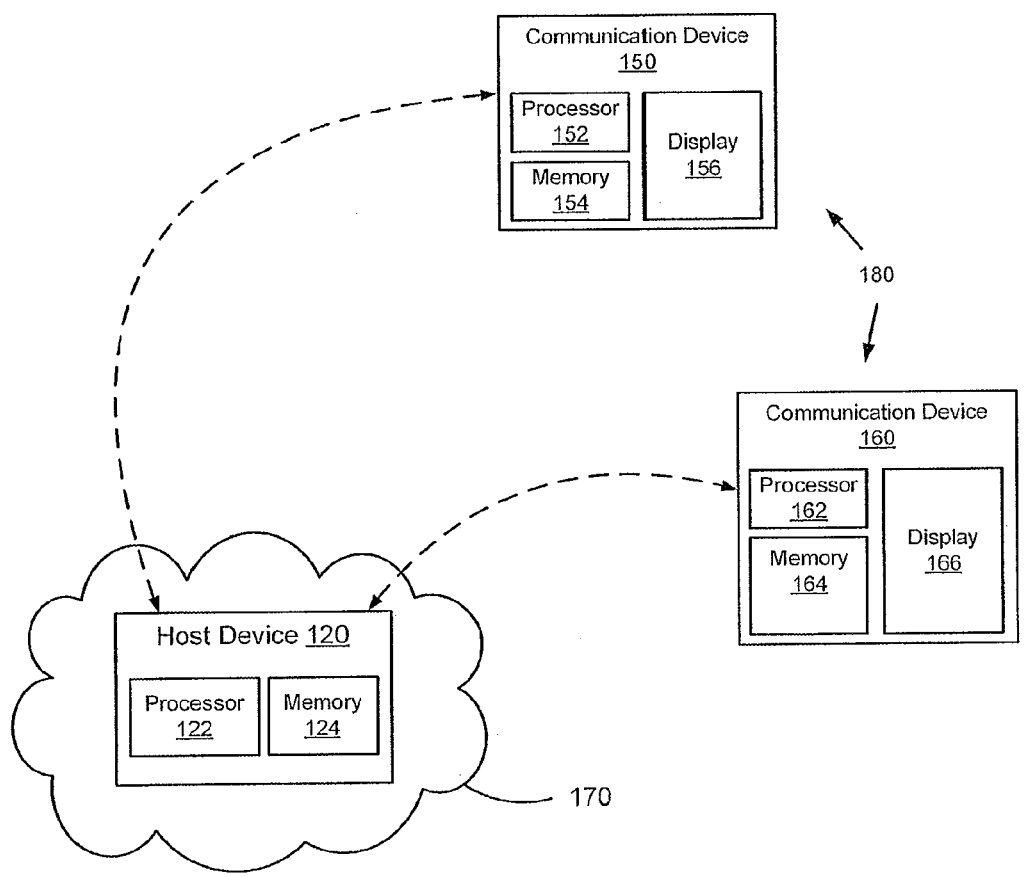
FIG. 1 is a schematic diagram that illustrates communication devices in communication with a host device via a network, according to an embodiment.

In some embodiments, a non-transitory processor-readable medium stores code representing instructions to cause a processor to receive, from a user, an input of at least one value associated with financial information of a married couple. In some embodiments, the at least one value associated with financial information of the married couple can include historical earning information for the married couple. In some embodiments, the at least one value associated with financial information of the married couple can include at least one of historical Social Security covered earnings, an expected inflation rate, an average wage index (AWI) growth rate, a life expectancy for at least one individual from the married couple, or a discount rate.

The code can represent instructions to cause the processor to calculate, using the at least one value, an average indexed monthly earnings (AIME) value and a primary insurance amount (PIA) value for each individual from the married couple. In some embodiments, the code to cause the processor to calculate the PIA value can include code to calculate the PIA value for an individual from the married couple for each year in which that individual is eligible to receive Social Security benefits.

The code can represent instructions to cause the processor to calculate, using the AIME value or the PIA value for each individual from the married couple, a set of Social Security election outcomes using each election strategy from a set of election strategies for each age combination from a set of age combinations for the married couple. In some embodiments, the set of age combinations can include each Social Security electable age for a first individual from the married couple paired with each Social Security electable age for a second individual from the married couple. In some embodiments, the code to cause the processor to calculate the set of Social Security election outcomes can include code to cause the processor to calculate each Social Security election outcome from the set of Social Security election outcomes by calculating each component from a set of components of a total family benefit using one of a present value of an annuity (PVA) function or a net present value (NPV) function, and summing the set of components to determine the total family benefit for that Social Security election outcome.

The code can also represent instructions to cause the processor to present the set of Social Security election outcomes to the user. In some embodiments, the code represents instructions to cause the processor to select an optimal result from each election strategy from the set of election strategies. The code to cause the processor to present can include code to cause the processor to present the optimal result for at least one election strategy from the set of election strategies to the user.

In some embodiments, the code can further represent instructions to cause the processor to calculate a monetary difference between a present value of a first Social Security election outcome from the set of Social Security election outcomes and a present value of a second Social Security election outcome from the set of Social Security election outcomes. Furthermore, the code can represent instructions to cause the processor to present the monetary difference to the user.

In some embodiments, an apparatus includes an input module, an election strategy calculation module, and a presentation module. The input module can be configured to receive, from a user, an input of at least one value associated with financial information of a married couple. In some embodiments, the input module can be configured to receive, from the user, an input of at least one of an AIME value or a PIA value. The election strategy calculation module can be operatively coupled to the input module and configured to calculate a set of Social Security election outcomes using each election strategy from a set of election strategies for each age combination from a set of age combinations for the married couple using the at least one value, the AIME value, or the PIA value. The set of age combinations can include each Social Security electable age for a first individual from the married couple paired with each Social Security electable age for a second individual from the married couple. The presentation module can be operatively coupled to the election strategy calculation module and configured to present the set of Social Security election outcomes to the user. In some embodiments, the election strategy calculation module can be configured to select an optimal result from each election strategy from the set of election strategies. The presentation module can be configured to present the optimal result for at least one election strategy from the set of election strategies to the user.

In some embodiments, the apparatus can further include an AIME calculation module, a PIA calculation module, and a comparison module. The AIME calculation module can be configured to calculate the AIME value based on the at least one value associated with the financial information of the married couple. The PIA calculation module can be configured to calculate the PIA value based on the at least one value associated with the financial information of the married couple. In some embodiments, the PIA calculation module can be configured to calculate the PIA value for an individual from the married couple for each year in which that individual is eligible to receive Social Security benefits using the at least one value associated with the financial information of the married couple. The comparison module can be configured to calculate a monetary difference between a present value of a first Social Security election outcome from the set of Social Security election outcomes and a present value of a second Social Security election outcome from the set of Social Security election outcomes, and the presentation module can be configured to present the monetary difference to the user.

FIG. 1 is a schematic diagram that illustrates communication devices 180 in communication with a host device 120 running a Social Security optimization system, via a network 170, according to an embodiment. Specifically, the communication devices 150 and 160 are configured to be operatively coupled to and communicate with the host device 120 via the network 170. The network 170 can be any type of network (e.g., a local area network (LAN), a wide area network (WAN), a virtual network, a telecommunications network, etc.) implemented as a wired network and/or wireless network. In some embodiments, for example, the communication devices 150 and 160 can be personal computers operatively connected to the host device 120 via an Internet service provider (ISP) and the Internet (e.g., network 170). Although only the communication devices 150 and 160 are shown in FIG. 1, the host device 120 can be configured to be operatively coupled to and communicate with more than two communication devices via the network 170.

The host device 120 can be any type of device configured to send data over the network 170 to and/or receive data from one or more of the communication devices (e.g., the communication device 150, 160). In some embodiments, the host device 120 can be configured to function as, for example, a server device (e.g., a web server device), a storage device, a network management device, a data repository, and/or the like.

As shown in FIG. 1, the host device 120 includes a processor 122 and a memory 124. The processor 122 of the host device 120 can be any suitable processing device configured to run and/or execute the Social Security optimization system. For example, the processor 122 can be configured to execute Social Security optimization processes and/or methods in response to receiving a signal from a communication device 180, as described in further detail herein. More specifically, as described in further detail herein, the processor 122 can be configured to execute modules, functions and/or processes to provide a user (e.g., a married couple) of a communication device 180 with a Social Security election analysis. In some embodiments, the processor 122 can be a general purpose processor, a Field Programmable Gate Array (FPGA), an Application Specific Integrated Circuit (ASIC), a Digital Signal Processor (DSP), and/or the like.

The memory 124 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, as described in detail with respect to FIGS. 2, 5 and 6, the memory 124 can store instructions to cause the processor 122 to execute modules, processes and/or functions associated with the Social Security optimization system.

In some embodiments, the memory 124 of the host device 120 can act as a data repository. In such embodiments, the data associated with the Social Security optimization modules, functions and/or processes can be stored in the memory 124 of the host device 120. When a user (e.g., a married couple, a financial advisor, etc.) wishes to view data associated with a specific married couple via, for example, the communication device 150 or 160, the host device 120 can send the data to the communication device 150 or 160 in response to a signal requesting the data being received from the communication device 150 or 160.

Further, in some embodiments, the memory 124 of the host device 120 can store account information associated with users authorized to access the data stored in the memory 124. Each user can be authorized to access certain portions of data stored in the memory 124. In some embodiments, for example, a premium client (i.e., a client that has purchased a premium package) can be authorized to access and view the outcomes of all possible Social Security election strategies; while a basic client (i.e., a client that has only purchase a basic package) can be authorized to access and view only the outcome of an optimal Social Security election strategy. In such embodiments, for example, the host device 120 can store, within the memory 124, a username and password associated with a user, extent of authority of the user (e.g., access rights), election outcomes for various election strategies associated with the user, and/or the like. Alternatively, such information can be stored in a database (not shown in FIG. 1) within or operatively coupled to the host device 120.

Each of the communication devices 180 can be, for example, a computing entity (e.g., a personal computing device such as a desktop computer, a laptop computer, etc.), a mobile phone, a personal digital assistant (PDA), and/or so forth. Although not shown in FIG. 1, in some embodiments, each of the communication devices 180 can include one or more network interface devices (e.g., a network interface card) configured to connect the communication devices 180 to the network 170. In some embodiments, the communication devices 180 can be referred to as client devices.

As shown in FIG. 1, the communication device 160 has a processor 162, a memory 164, and a display 166. The memory 164 can be, for example, a random access memory (RAM), a memory buffer, a hard drive, and/or so forth. The display 166 can be any suitable display, such as, for example, a liquid crystal display (LCD), a cathode ray tube display (CRT) or the like. Similar to communication device 160, the communication device 150 has a processor 152, a memory 154, and a display 156. In other embodiments, the communication devices 150, 160 can include other types of output device(s) instead of or in addition to the displays 156, 166. For example, the communication devices 150, 160 can include an audio output device (e.g., a speaker), a tactile output device, and/or the like.

In some embodiments, a web browser application can be stored in the memory 164 of the communication device 160. Using the web browser application, the communication device 160 can send data to and receive data from the host device 120. Similarly, the communication device 150 can include a web browser application. In such embodiments, the communication devices 150 and 160 can act as thin clients. This allows minimal data to be stored on the communication devices 150 and 160. In other embodiments, the communication devices 150 and 160 can include one or more applications specific to communicating with the host device 120 during a Social Security optimization process. In such embodiments, the communication devices 150 and 160 can download the application(s) from the host device 120 prior to participating in the optimization process.

As discussed above, the communication devices 150 and 160 can send data to and receive data from the host device 120 associated with the Social Security optimization system. In some embodiments, the data sent between the communication devices 150, 160 and the host device 120 can be formatted using any suitable format. In some embodiments, for example, the data can be formatted using extensible markup language (XML), hypertext markup language (HTML) and/or the like.

In some embodiments, one or more portions (e.g., the processor 122) of the host device 120 and/or one or more portions (e.g., the processor 152, 162) of the communication devices 180 can include a hardware-based module (e.g., a digital signal processor (DSP), a field programmable gate array (FPGA)) and/or a software-based module (e.g., a module of computer code to be executed at a processor, a set of processor-readable instructions that can be executed at a processor). In some embodiments, one or more of the functions associated with the host device 120 (e.g., the functions associated with the processor 122) can be included in one or more such modules (see, e.g., FIG. 2). In some embodiments, one or more of the functions associated with the communication devices 180 (e.g., functions associated with processor 152 or processor 162) can be included in one or more modules similar to the modules shown and described with respect to FIG. 2.

In some embodiments, one or more of the communication devices 180 can be configured to perform one or more functions associated with the host device 120, and vice versa. For example, in some embodiments, at least a portion of the Social Security optimization system can be executed at the communication device 160. In other embodiments, the entire Social Security optimization system can be executed at the communication device 160. In such embodiments, the processor 162 can execute instructions associated with the Social Security optimization system stored local to the communication device 160 in the memory 164. In such embodiments, the communication device 160 need not be in communication with the host device 120 to execute the Social Security optimization system.

Figure 2:
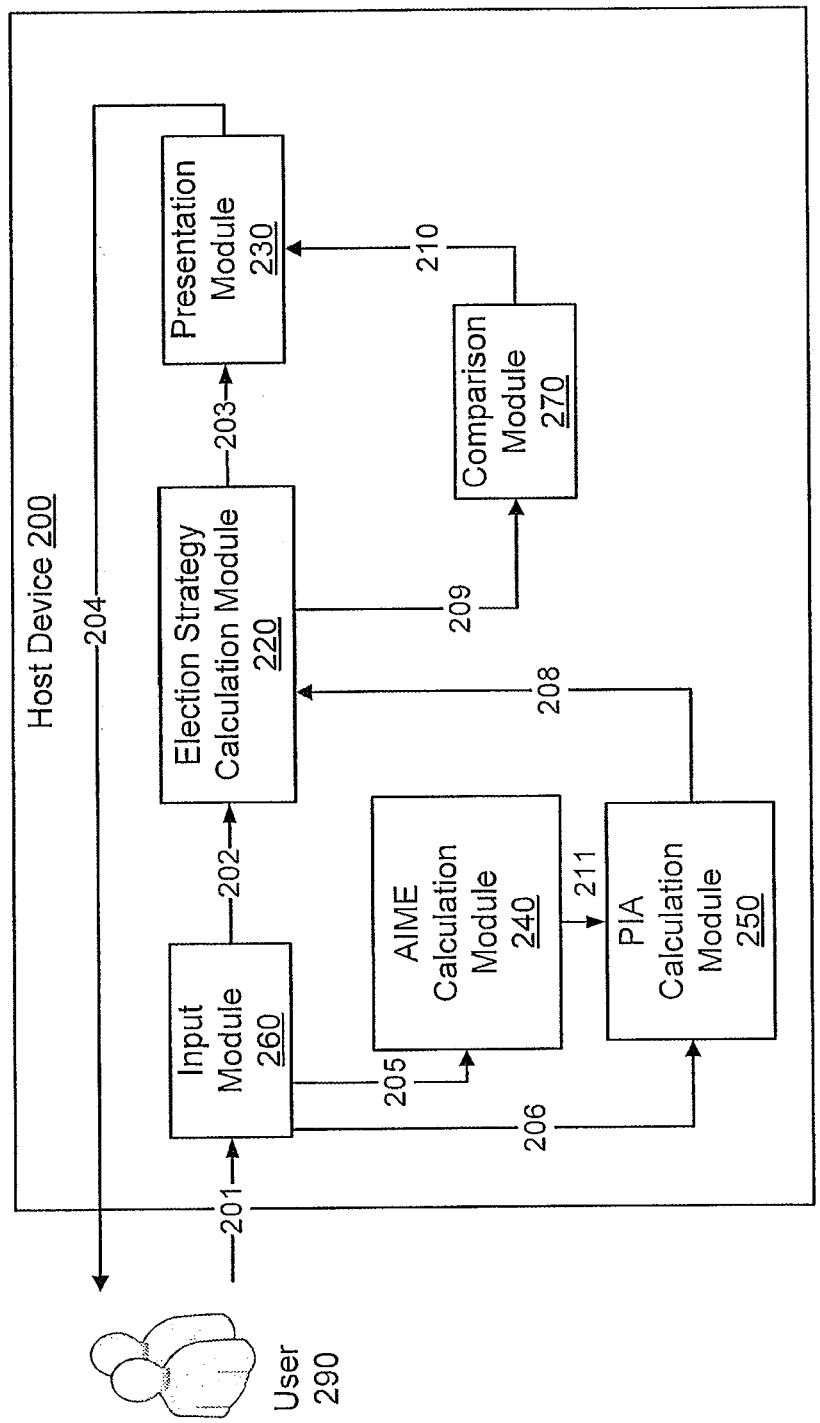
FIG. 2 is a schematic diagram of a host device configured to perform a Social Security optimization analysis for a user, according to an embodiment.

FIG. 2 is a schematic diagram of a host device 200 configured to perform a Social Security optimization analysis for a user 290, according to an embodiment. The host device 200 can be structurally and functionally similar to the host device 120 shown and described with respect to FIG. 1. Although not shown in FIG. 2, the host device 200 can include a memory and a processor, which are similar to the memory 124 and the processor 122 shown and described with respect to FIG. 1.

As shown in FIG. 2, the host device 200 includes an input module 260, an AIME calculation module 240, a PIA calculation module 250, an election strategy calculation module 220, a comparison module 270, and a presentation module 230. Although not shown in FIG. 2, the modules can be stored in, for example, the memory within the host device 200 and executed by, for example, the processor of the host device 200. Each of the modules can be a hardware-based module (e.g., a DSP, a FPGA), a software-based module (e.g., a module of computer code to be executed at the processor, a set of processor-readable instructions that can be executed at the processor), or a combination of hardware and software modules.

In some embodiments, each module shown in FIG. 2 can be in direct communication with each other module. In other embodiments, each module need not be in direct communication with each other module. For example, the input module 260 is in direct communication with the AIME calculation module 240, the PIA calculation module 250 and the election strategy calculation module 220, while might not be in direct communication with the presentation module 230. In some embodiments, each module hosted in the host device 200 can be operatively coupled to each other module hosted in the host device 200.

The modules shown in FIG. 2 can function as a Social Security optimization system for a user, such as the user 290. That is, the modules can be configured to collectively perform a Social Security optimization analysis for the user 290. The user 290 can be any person that can operate and/or interact with the host device 200. In some embodiments, the user 290 can be a representative of a married couple. For example, the user 290 can be an individual from the married couple, a relative (e.g., child) of the married couple, or a financial advisor hired by the married couple. As used herein, the higher-earning spouse from the married couple is referred to as the primary earner, and the lower-earning spouse is referred to as the secondary earner.

In some embodiments, as described in detail herein, the user 290 can provide information associated with the married couple to the host device 200, and receive and/or view Social Security election outcomes for the married couple that are produced by the host device 200 based on the provided information associated with the married couple. In some embodiments, the user 290 can interact with the host device using a communication device similar to the communication device 180 shown and described with respect to FIG. 1. In some embodiments, the user 290 can enter the information associated with the married couple to the Social Security optimization system using, for example, a keypad, a touch screen, a mouse, or any other suitable input means. In some embodiments, the user 290 can receive or view the Social Security election outcomes for the married couple using, for example, a monitor, a speaker, a printer, or any other suitable output means.

The input module 210 can be configured to receive input values from the user 290, shown as signal 201 in FIG. 2. The input values received from the user 290 can include data regarding the married couple. In some embodiments, the input values can include data and/or information associated with each individual from the married couple, such as, for example, name, age, historical Social Security covered earnings, life expectancy, life expectancy adjustment (increase or decrease from a standard, predetermined life expectancy), etc. In some embodiments, the input values can include data and/or information associated with the married couple, such as, for example, discount rate, expected inflation rate, expected average wage inflation, AWI growth rate, etc. Furthermore, in some embodiments, the input values received from the user 290 can include at least one value associated with financial information of the married couple. Such financial information can be, for example, historical Social Security covered earnings, expected inflation rate, expected wages, and/or the like, for an individual or both spouses of the married couple.

FIG. 3 illustrates assumptions and projected Social Security election benefits for a married couple Dick and Jane, according to an embodiment. The table 310 illustrates the input values associated with the married couple. As shown in the table 310 of FIG. 3, data and information associated with each individual from the married couple (i.e., Dick or Jane) can include, for example, at least name, date of birth, gender, life expectancy, life expectancy adjustment, and/or full retirement age for the individual; data associated with the married couple (i.e., Dick and Jane) can include, for example, at least an assumed inflation and a real rate of return. Furthermore, in some embodiments, more or less information than those items shown in the table 310 can be received from a married couple and used in the Social Security optimization process for the married couple. For example, in some embodiments, historical and expected earnings of Dick and/or Jane can be received. For another example, information associated with other non-Social Security taxed employment can be received. Based on the input values received from Dick and Jane, a Social Security optimization analysis can be performed for the married couple Dick and Jane.

Returning to FIG. 2, the AIME calculation module 240 can be configured to calculate one or more AIME values for each individual from the married couple based on the input value (carried by the signal 201) received from the user 290. In order to calculate the AIME values, the AIME calculation module 240 can be configured to receive data and/or information associated with the married couple, which can be used to calculate the AIME values, from the input module 260. The data received from the input module 260 at the AIME calculation module 240 is carried by signal 205 as shown in FIG. 2.

In some embodiments, in calculating the AIME values for each individual from the married couple, earnings for the individual can be indexed to the year that individual turns a certain age, such as age 60. The AWI number for that year can be divided by the AWI numbers for prior years, and the results can be included in a table of factors. The factor for each year can then be applied to the earnings for that year to produce a table of present value of past earnings for that individual from the married couple.

The PIA calculation module 250 can be configured to calculate one or more primary insurance amount (PIA) values for each individual from the married couple based on the input value (carried by the signal 201) received from the user 290. Similar to the AIME calculation module 240, in order to calculate the PIA values, the PIA calculation module 250 can be configured to receive data and/or information associated with the married couple, which can be used to calculate the PIA values, from the input module 260. The data received from the input module 260 at the PIA calculation module 250 is carried by signal 206 as shown in FIG. 2. In some embodiments, the PIA calculation module 250 can receive the calculated AIME values from the AIME calculation module 240, shown as signal 211 in FIG. 2.

In some embodiments, the PIA calculation module 250 can be configured to calculate the PIA value for each individual from the married couple for each year or month (e.g., ages equal to or greater than 62) in which that individual is eligible to receive Social Security benefits. Such a PIA value can be calculated using, for example, appropriate or projected formula bend-points, the input values associated with the individual that are received from the user 290, and/or the calculated AIME values received from the AIME calculation module 240. For example, the PIA can be calculated for the year an individual from the married couple turns 62 using appropriate or projected formula bend-points. First, the PIA calculation module 250 can be configured to determine whether the bend-points have been set or need to be projected. If the bend-points need to be projected, the PIA calculation module 250 can be configured to inflate the AWI number by an expected average wage inflation rate. In some embodiments, the expected average wage inflation rate can be input by the user 290. The PIA calculation module 250 can then be configured to apply the PIA formula to the AIME values to arrive at a benefit amount, for example, 90% up to the first bend, 32% up to the second bend, and 15% above that.

In some embodiments, several additional benefit values other than the PIA values that can be potentially used in later stages of the Social Security optimization process can be calculated. For example, present and future values of each spouse's benefit based on his or her own earnings record can be calculated, including any applicable reductions and/or credits for early or delayed claiming. For another example, the excess spousal benefit values at each whole-year election age when spousal benefits are to be coordinated with benefits under the spouse's earnings record can be calculated. For yet another example, spousal-only-benefits for each whole year election age for each spouse can be calculated, assuming a restricted application was filed and the spousal benefit was the only benefit being claimed. These additional benefit values can be used in building present-value benefit components for the married couple.

In some embodiments, such additional benefit values can be calculated at the election strategy calculation module 220 or the PIA calculation module 250. In some other embodiments, alternatively, such additional benefit values can be calculated at one or more other modules (not shown in FIG. 2) separate from the modules shown in FIG. 2. In such embodiments, those modules can receive the input values from the input module 260, calculate the additional benefit values, and then send the calculated results to the election strategy calculation module 220.

The election strategy calculation module 220 can be configured to calculate a set of Social Security election outcomes using each applicable election strategy from a set of election strategies for each age combination from a set of age combinations for the married couple. The set of Social Security election outcomes can be calculated at the election strategy calculation module 220 using the input values received from the user 290 (e.g., carried by signal 202 shown in FIG. 2), one or more PIA values (e.g., carried by signal 208 shown in FIG. 2), and/or any additional calculated benefit values (not shown in FIG. 2) for each individual from the married couple.

In some embodiments, the PIA values associated with the married couple can be calculated at and provided by PIA calculation module 250 to the election strategy calculation module 220. In some other embodiments, the input module 260 can be configured to receive, from the user 290, an input of the PIA value for the married couple. In such embodiments, the PIA values that are used in calculating the optimal Social Security election outcomes for the married couple can be entered by the user 290, rather than calculated at and provided by the PIA calculation module 250.

For example, the user 290 can elect to enter a PIA override value associated with the married couple, which is an estimated PIA value for the married couple. Such a PIA override value can allow the Social Security optimization system to skip the AIME calculation and the PIA calculation, and use the PIA override value in benefit calculations.

In some embodiments, to generate Social Security election outcomes for the married couple, the election strategy calculation module 220 can be configured to first identify the election strategies available for the married couple. Specifically, the election strategy calculation module 220 can be configured to evaluate the specific scenario of the married couple based on the data, information and/or calculated values received from the input module 260 and/or the PIA calculation module 250. Based on the evaluation results, the election strategy calculation module 220 can determine for each election strategy from a set of election strategies whether or not that election strategy is available for the married couple. In some embodiments, one or a series of logical tests can be used at the election strategy calculation module 220 to determine whether or not the married couple can use one or more election strategies. Such logical tests can be designed based on Social Security rules that are in effect at the time the election is made. Thus, the election strategies that are available for the married couple can be identified at the election calculation module 220.

Next, the election strategy calculation module 220 can be configured to calculate a set of Social Security election outcomes using each available election strategy from the set of election strategies. For each available election strategy from the set of election strategies, lifetime family benefits can be calculated for each age combination from a set of age combinations for the married couple. In some embodiments, such a set of age combinations for a married couple can include both primary age combinations for the married couple and (optionally) secondary age combinations for the married couple. Primary age combinations include a combination of solo electable ages (i.e., an age at which an individual is eligible to begin receiving Social Security retirement insurance benefits (RIB) under his or her own earnings record) for each individual from the married couple. That is, primary age combinations can include each solo electable age for a first individual from the married couple paired with each solo electable age for a second individual from the married couple. For example, if the electable age is considered on an annual basis, the primary age combinations for the married couple can include solo electable ages 62-70 (i.e., 9 years) for each individual from the married couple, thus generating a total of 9×9 (i.e., 81) primary age combinations for the married couple. For another example, if the electable age is considered on a monthly basis, the set of age combinations for the married couple can include solo electable ages that range from the $62^{nd}$ birthday to the $70^{th}$ birthday (i.e., 96 months in 8 years) for each individual from the married couple, thus generating a total of 96×96 (i.e., 9216) primary age combinations for the married couple.

In some embodiments, for each given primary age combination within each available election strategy, the married couple can have secondary age combinations. The secondary age combinations can include, for example, other types of election ages at which an individual is eligible to receive auxiliary Social Security benefits, spousal benefits, and/or the like. A secondary age combination can include, for example, a spousal electable age (i.e., an age at which an individual is eligible to begin receiving spousal benefits or spousal excess under his or her spouse's earning record) for one or both individuals from the married couple. That is, the secondary age combinations can include, for example, each spousal electable age for a single individual from the married couple; or each spousal electable age for a first individual from the married couple paired with each spousal electable age for a second individual from the married couple. In some embodiments, secondary age combinations can include any other types of election ages that are defined for receiving auxiliary benefits under the Social Security laws. In some embodiments, for example, secondary age combinations can include election ages for a first individual to receive Social Security benefits as a child or a widow of a second individual based on the second individual's earnings record.

In some embodiments, the age combination (including primary and secondary age combinations) for the married couple can include each Social Security electable age (a solo electable age or a spousal electable age) that is defined, for an individual from the married couple, by the Social Security laws at the time the election is made. In some embodiments, one or a series of logical tests can be used to eliminate age combinations (including primary and secondary age combinations) that are precluded by applicable Social Security rules.

After possible age combinations (including primary age combinations and/or (optionally) secondary age combinations) are determined for the married couple, the election strategy calculation module 220 can be configured to calculate election outcomes of an available election strategy for the age combinations. Such a calculation can be performed for the possible age combinations for each available election strategy. In some embodiments, for example, for a given election strategy, the election outcomes can be calculated by calculating for the first available age combination under that election strategy then incrementing each spousal electable age under that strategy by 1 (year or month depending on whether an annual or monthly basis is adopted). In some embodiments, whether and/or when an individual from the married couple can receive spousal benefits or spousal excess depends on the specific scenario of the married couple, and can vary from one scenario to another. Thus, for a given election strategy, an age combination (including primary and secondary age combinations) for a married couple can include $9^2$ to $9^4$ combinations (solo electable ages for both individuals and (optionally) spousal electable ages for both individuals with 9 whole year options for each electable age) if considered on an annual basis; or $96^2$ to $96^4$ (solo electable ages for both individuals and (optionally) spousal electable ages for both individuals with 96 month options (8 whole year) for each electable age) if considered on a monthly basis.

In some embodiments, a grid can be used to represent the intersection of the possible primary age combinations that are available to the married couple. If considered on an annual basis, the grid can be, for example, 9×9 (age 62-70, or 9 years for each individual from the married couple) that represents all whole-year election age combinations for the married couple. If considered on a monthly basis, the grid can be, for example, 96×96 (12 months for each of the 8 years (i.e., the months between an individual's $62^{nd}$ and $70^{th}$ birthday)). For each election age combination from the set of age combinations, an expected present value of the lifetime family benefits associated with a given election strategy can be calculated for the married couple, assuming restricted spousal benefits or spousal excess are elected at an optimal time. The value represents the expected value of benefits that would be received by the married couple to specified dates of death, based on the given election age combination and the given election strategy.

In some embodiments, the present value of the lifetime family benefits associated with the married couple for a given election strategy and a given age combination can be calculated using various present value functions including, for example, an annuity (PVA) function, a net present value (NPV) function, or any other suitable function. For example, the present value of the lifetime family benefits can be calculated using a linear method. Specifically, future-value cashflows can be laid out at specified points in time, and then a present value function (e.g., the NPV function) can be performed to calculate the present value of the lifetime family benefits based on the cashflows.

In some embodiments, the calculation for the present value of the lifetime family benefits for the married couple can be divided into calculations for a number of components of the corresponding the lifetime family benefits. If the two spouses from the married couple are denoted by client 1 and client 2 respectively (i.e., client 1 is the higher wage earner and client 2 is the lower wage earner), the possible components of the lifetime family benefits for the married couple can include, for example: i) client 1 solo benefit to first death; ii) client 1 spousal benefit to first death; iii) client 2 solo benefit to first death; iv) client 2 spousal benefit to first death; v) client 2 spousal excess to first death; and vi) survivor benefit to second death.

Next, a present value of each component can be calculated using, for example, the following three steps: 1) the total number of years when benefits are received by the married couple can be calculated for the given combination of election ages; 2) the number of years can be multiplied by the present value of the corresponding individual's benefit amount (calculated as an additional benefit value, described above); and 3) a present value function (e.g., the PVA function) can be performed, based on the result from step 2), to calculate the present value of that component. Finally, the present value of each component can be summed to produce the expected present value of the lifetime family benefits for married couple. By dividing the calculation for the present value of the lifetime family benefits for the married couple into calculations for multiple components in such a way, the processor and/or memory load required for the calculation can be reduced, thus improving the efficiency of performing the calculation.

In some embodiments, the election strategy calculation module 220 can be configured to calculate the Social Security election outcomes for the married couple using each election strategy from a set of multiple different election strategies. In some embodiments, as described herein, each election strategy can include, for example, 81 possible whole-year primary age combinations (i.e., 9 election ages for each individual from the married couple), or 9216 possible monthly primary age combinations (i.e., 96 election months for each individual from the married couple). Furthermore, depending on the election strategy, election outcomes can be calculated for each election strategy for each of multiple secondary age combinations of the married couple.

In some embodiments, for each election strategy, a set of logical tests can be applied at the election strategy calculation module 220 to determine whether this election strategy is available for the married couple and if so, at what age combinations. More specifically, the possible components (e.g., the components i-vi described above) of the lifetime family benefits for the married couple under this election strategy can be identified, and then the steps 1-3 (as described above) can be performed to calculate the expected lifetime family benefits for each election age combination and for the given election strategy. In some embodiments, the resulting outcomes for each age combination (including primary and secondary age combinations) can be displayed in, for example, a strategy grid associated with the given election strategy. Such a process can be repeated for each election strategy from the set of election strategies, thus generating a set of strategy grids.

In some embodiments, the set of election strategies can include, for example, nine election strategies that are described in further detail below. Among these nine election strategies, Strategies #1 and #2 assume a single interaction with the Social Security office. In some embodiments, these two election strategies are the base strategies that most people fall under, by default. In some or all of the nine election strategies, the married couple has the option to make changes on the following four ages associated with the married couple: election age for client 1's primary benefit, election age for client 1's spousal benefit, election age for client 2's primary benefit, and election age for client 2's spousal benefit. For example, the election age for client 1's primary benefit can be selected between 62 and 70. For another example, the election age for client 2's spousal benefit can be selected on or after the year when client 1's primary benefit is elected.

In strategy #1, client 1 and client 2 each files for benefits on their own earnings records independently. In strategy #2, client 1 files on his or her own earnings record and client 2 files for all benefits to which she or he is entitled. In most cases, client 2 will have a benefit under her or his own earnings record and may have an additional spousal benefit available under client 1's earnings record. The strategy #2 assumes that client 2 will elect once. If no spousal benefit is available to client 2 at the time client 2 elects (e.g., due to client 1 not yet having elected), no spousal benefit will be included in this strategy.

Strategies #3-#9 include multiple interactions with the Social Security office, or a change to an initial benefit election. In some embodiments, these strategies can be designated as "switch strategies" because they involve one spouse or the other electing a limited benefit for a period of time, then adding or "switching" over to a larger benefit at some point in the future. In some embodiments, several basic techniques such as "restricted application" and "file and suspend" can be potentially used to enable these switch strategies, as described in detail below.

The first potential technique can be referred to as "restricted application." After an individual reaches the normal retirement age, he or she has the option to restrict an application to exclude certain benefits. If a benefit is excluded, it will continue to build delayed retirement credits. For example, a higher-earning spouse from a married couple, who may want to wait until age 70 to collect his own benefit, may be able to file at 66 for only the benefit available under his spouse's work record, while still allowing his own benefit to build delayed retirement credits. Then at age 70, he can switch to his own benefit. Alternatively, a lower-earning spouse can restrict his or her application to only spousal benefits while continuing to claim delayed credits on his or her own earnings record.

The second potential technique can be referred to as "file and suspend." Spousal benefits are not available until the primary earner (i.e., the higher-earning spouse) has filed for his or her own benefits. The Senior Citizens' Freedom to Work Act of 2000 allows a worker to earn delayed retirement credits after filing for benefits if he requests that he not receive benefits during a given period. As a result, a higher-earning spouse can file for benefits, then suspend the benefit, and continue to earn delayed credits. In the process, he or she will have made his or her spouse eligible for spousal benefits under his or her earnings record. Strategies #3-9 represent allowable combinations of the two techniques outlined above.

In strategy #3, client 2 elects his or her solo benefit, and then at some point in the future adds a spousal benefit. Most often this will occur when it makes sense for the lower-earning spouse to elect early, but the higher-earning spouse to elect late. As a result, no spousal benefit is available when client 2 elects, but when client 1 elects in the future, a spousal benefit becomes available to client 2. Strategy #4 modifies strategy #3 by having client 1 to file and suspend, which allows client 2 to add spousal excess prior to the date at which client 1 begins receiving benefits.

In strategy #5, client 2 files for benefits on his or her own record at each possible age. Client 1 files a restricted application for only her or his spousal benefit under the earnings record of client 2, at the first possible date, then at each possible age, elects on his own record. When client 1 elects on her or his own record, spousal excess may be added to client 2's benefit. Strategy #6 modifies strategy #5 by having client 2 file and suspend, which allows client 2 to continue to build delayed retirement credits on his or her own record during the time client 1 is collecting a spousal benefit.

In strategy #7, client 2 files a restricted application for only spousal benefits under client 1's earnings record for a period of time, and then switches to her or his own benefit at a later election age. Strategy #8 modifies strategy #7 by having client 1 to file and suspend, which allows client 1 to continue to build delayed retirement credits during the time client 2 is collecting a spousal benefit under client 1's earnings record and building delayed retirement credits on her or his own record.

Strategy #9 is similar to strategy #2, but is calculated using only the spousal benefit with no adjustment for client 2's earnings record. This strategy has client 1 file and suspend at his or her full retirement age, which allows client 2 to elect a spousal benefit earlier than would otherwise be available.

In some embodiments, after the set of Social Security election outcomes (e.g., a present value of the lifetime family benefits) for the married couple are calculated at the election strategy calculation module 220 using each election strategy from the set of election strategies for each age combination from the set of age combinations, the election strategy calculation module 220 can be configured to send a portion or all of the resulting Social Security election outcomes to the presentation module 230, shown as signal 203 in FIG. 2. In some other embodiments, the election strategy calculation module 220 can be configured to send a portion or all of the resulting Social Security election outcomes to the comparison module 270, shown as signal 209 in FIG. 2.

In response to receiving the Social Security election outcomes from the election strategy calculation module 220, the comparison module 270 can be configured to analyze and/or compare the Social Security election outcomes calculated using each election strategy from the set of election strategies. Specifically, the comparison module 270 is capable of calculating a monetary difference between the expected present values of the lifetime family benefits associated with any pair of election strategies from the set of election strategies (for any given age combination or two different age combinations) for the married couple. The comparison module 270 is also capable of calculating a monetary difference between the expected present values of the lifetime family benefits associated with a given election strategy for two different age combinations of the married couple. Thus, the comparison module 270 can compare the Social Security election outcomes that are calculated using two different election strategies (for any given age combination or two different age combinations), as well as the Social Security election outcomes that are calculated using a given election strategy for two different age combinations, for the married couple.

In some embodiments, the comparison module 270 can select an optimal result for each election strategy from the set of election strategies. That is, for a given election strategy, the comparison module 270 can be configured to determine the age combination (including primary and secondary age combinations), among the possible age combinations, for the married couple to receive the highest lifetime family benefits. As a result, the highest lifetime family benefit that the married couple can potentially receive (using that election strategy) is the optimal result for that election strategy. Furthermore, in some embodiments, the comparison module 270 can be configured to send the optimal result for each election strategy to the presentation module 230, via signal 210 shown in FIG. 2.

In some embodiments, the comparison module 270 can aggregate the best, the worst, and/or other present values of lifetime family benefits calculated from the set of election strategies for each primary age combination (assuming an optimal secondary age combination associated with that primary age combination is adopted). Thus, the optimal election strategy for each primary age combination, which is associated with the highest present value of lifetime family benefits for that primary age combination, can be identified. In some embodiments, the comparison module 270 can generate an aggregate strategy grid based on the identified optimal election strategies and send it to the presentation module 230 (e.g., via signal 210). The aggregate strategy grid can represent the present values of the lifetime family benefits received by the married couple for each combination of election ages, assuming that the married couple chooses the optimal election strategy from the set of election strategies at that primary age combination. Furthermore, at the presentation module 230, such an aggregate grid can be provided or illustrated to the user 290 in form of, for example, a map, a table, an interactive interface, a report, and/or the like, such that the best election option for each primary age combination can be presented to the user 290.

FIG. 4 is a selectable user-interface illustrating the optimal results for each combination of election ages (i.e., 62-70 for each individual, assuming an optimal secondary age combination is adopted) across the election strategies (i.e., strategies #1-#9) for a married couple Patrick and Carolyn, according to an embodiment. Both Patrick and Carolyn can elect to receive his or her benefits (e.g., personal benefits, spousal benefits, etc.) at any year when he or she turns an age between 62 and 70 (including 62 and 70). The monetary value shown in FIG. 4 for any of the 81 primary age combinations is the optimal result of lifetime family benefits that Patrick and Carolyn can expect to receive if they elect at the corresponding ages, respectively, using any of the strategies #1 to #9. For example, if Patrick elects at age 64 and Carolyn elects at age 68, the married couple can expect to receive a maximum lifetime family benefits of $628,402 if they choose the optimal strategy and spousal claiming ages associated with that primary age combination. For another example, if Patrick elects at age 68 and Carolyn elects at age 64, the married couple can expect to receive a maximum lifetime family benefits of $655,213 if they choose the optimal strategy and spousal claiming ages associated with that primary age combination. As shown in FIG. 4, the married couple can potentially receive a maximum lifetime family benefits of $695, 625, using one of the strategies #1 to #9, when both Patrick and Carolyn elect at age 70 (with optimal spousal claiming ages that are not shown in FIG. 4). In some embodiments, although not shown in FIG. 4, the optimal election strategy and secondary age combinations (e.g., spousal claiming ages) associated with each primary age combination can also be provided to the user.

In some embodiments, the comparison module 270 can select an overall optimal result (i.e., highest lifetime family benefits) across the election strategies and the age combinations. Thus, an overall optimal election strategy across the election strategies and for the age combinations can be identified. In some embodiments, such an overall result and the associated overall optimal election strategy can be determined by comparing the optimal results obtained for each election strategy over the age combinations (including primary and secondary age combinations as described above). As a result, the outcome that results in the highest lifetime family benefits among the optimal results obtained for each election strategy over the age combinations (including available primary and secondary age combinations) can be determined as the overall optimal result across all election strategies and all age combinations. Similarly, the election strategy associated with the best outcome can be determined to be the overall optimal election strategy.

In some other embodiments, such an overall result and the associated overall optimal election strategy can be determined by comparing the optimal results obtained for each age combination across all election strategies (as described above). As a result, the best outcome (i.e., the highest lifetime family benefits) among all the optimal results obtained for each age combination across all the election strategies can be determined as the overall optimal result across all election strategies and all age combinations, and the election strategy associated with the best outcome can be determined as the overall optimal election strategy. In the example of FIG. 4, the highest outcome across all age combinations, $695,625 as shown in FIG. 4, can be determined as the overall optimal result across all election strategies and all age combinations. The optimal election strategy (not identified in FIG. 4) for the age combination (e.g., primary age combination (70, 70) with an optimal secondary age combination not specified in FIG. 4) can be determined as the overall optimal election strategy.

In some embodiments, the election strategy calculation module 220 and the comparison module 270 can be configured to collectively calculate the optimal election outcome and select the optimal election strategy and the associated age combination (including the optimal solo claiming ages and/or spousal claiming ages) for the married couple. In the example of FIG. 3, based on the information of the married couple Dick and Jane that is provided in the table 310, the election strategy calculation module 220 can be configured to calculate various types of benefits that Dick and/or Jane can potentially receive. For example, the projected monthly benefit that Dick or Jane can receive from his or her own earnings record, when he or she elects at a certain age between 62 and 70, can be calculated. The results are illustrated in the table 320 shown in FIG. 3. Based on the results in the table 320 and other benefit outcomes (not shown in FIG. 3) calculated at the election strategy calculation module 220, the comparison module 270 can be configured to determine the optimal election outcome as well as the optimal election strategy and the associated age combination for Dick and Jane.

The optimal election strategy for Dick and Jane can be, for example, as follows. Dick should file a standard application for benefits at his full retirement age of 66. This will allow Jane to collect a spousal benefit under Dick's earnings record. Then, Dick should immediately request that his benefits be suspended. This will allow him to claim delayed retirement credits during the time his benefits are suspended. At age 70, Dick should request that his benefits be paid. His approximate monthly benefit would be $3,854.08, as shown in cell 322 in the table 320.

Meanwhile, Jane should file a restricted application for only her spousal benefit based on Dick's earnings record at Jane's full retirement age of 66. This will allow Jane to continue to earn delayed retirement credits on her own benefit. Jane's approximate spousal benefit would be, for example, $1,307.21 (not shown in the table 320). At age 69, Jane should file for her own benefit. Her approximate benefit on her own earnings record would be $2,094.17, as shown in cell 324 in the table 320.

Overall, the expected lifetime family benefits for Dick and Jane using this strategy would be, for example, $715,721.22. This is also the optimal election outcome for Dick and Jane across all available election strategies and for all possible age combinations. In comparison, the expected lifetime family benefits for Dick and Jane if they elect at the worst primary age combination would be, for example, $621,738.46; the expected lifetime family benefit for Dick and Jane if both spouses elect at age 62 would be, for example, $630,230.84; and the expected lifetime family benefit for Dick and Jane if both spouses elect at age 66 would be, for example, $663, 277.04.

In some embodiments, for a given primary age combination at which the married couple anticipates to elect Social Security benefits, the comparison module 270 can identify the best election strategy (with an associated secondary age combination) for that primary age combination. The comparison module 270 can further compare the resulting benefit outcome of that election strategy at that primary age combination to the overall optimal outcome over other age combinations (e.g., all available age combinations or a portion of the available age combinations) by defining an efficiency index. In some embodiments, the efficiency index can be defined as the ratio of the expected benefits under a given age combination to the overall optimal outcome under all age combinations, and can be expressed as a percentage. For example, using the above example having the anticipated primary election age combination for a married couple as (70, 70), the maximum expected lifetime family benefits that this married couple can receive (with an optimal election strategy and associated secondary age combination for that primary election age combination) is $695,625.39 by calculation. On the other hand, the overall optimal expected lifetime family benefits for this married couple, across all election strategies and over all age combinations, is $756,114.55 by calculation. Thus, the resulting efficiency index is 92% (i.e., the ratio of $695,625.39 to $756,114.55). That is, the anticipated election for the married couple is 92% efficient.

In some embodiments, similar to the election strategy calculation module 220, the comparison module 270 can be configured to send a portion or all of the results produced at the comparison module 270 to the presentation module 230, shown as signal 210 in FIG. 2. The results sent from the comparison module 270 to the presentation module 230 can include, for example, the optimal election outcomes for each election strategy (over one or more age combinations), the optimal election strategy and/or outcome for each age combination (across all election strategies), the overall optimal election strategy and/or outcome (across one or more election strategies and over one or more age combinations), etc. Furthermore, in some embodiments, the comparison module 270 can be configured to send the results in the form of for example, an aggregate strategy grid, a selectable user-interface (e.g., as shown in FIG. 4), a table, a report or any other suitable means. In other embodiments, the presentation module 230 can be configured to transfer the results received from the comparison module 270 and/or the election strategy calculation module 220 into one or more suitable forms before presenting them to the user 290.

The presentation module 230 can be configured to present the Social Security election results received from the election strategy calculation module 220 and/or the comparison module 270 to the user 290, shown as signal 204 in FIG. 2. As described herein, the results received from the election strategy calculation module 220 and/or the comparison module 270 at the presentation module 230 can include, for example, Social Security election outcomes (e.g., for a given election strategy and a given age combination, for all election strategies and all age combinations), optimal election strategies (e.g., for a given age combination, for all age combinations), and/or the like. In some embodiments, the Social Security election results received at the presentation module 230 can be presented to the user 290 in a suitable form, such as, for example, a report, a graph, a table, a selectable user-interface, or the like.

In some embodiments, the presentation module 230 can receive a monetary difference between two present values of two Social Security election outcomes. The Social Security election outcomes can be calculated using two different Social Security election strategies, or using a single Social Security election strategy for different age combinations. The presentation module 230 can be configured to present the received monetary difference to the user 290. In some embodiments, the presentation module 230 can be configured to present the optimal result (e.g., in terms of an expected value of lifetime family benefits) for at least one election strategy to the user 290. In some embodiments, the presentation module 230 can be configured to present a result associated with the optimal election strategy, which is selected at the comparison module 270, to the user 290.

In some embodiments, the presentation module 230 can be configured to present a "what is it worth" calculator to the user 290. Such a "what is it worth" calculator can illustrate, for example, the Social Security election outcome (e.g., in terms of an expected value of lifetime family benefits) associated with a given Social Security election strategy. Thus, the "what is it worth" calculator can indicate to the user 290 the monetary value of the benefits that the married couple can receive if they choose that Social Security election strategy.

In some embodiments, the presentation module 230 can be configured to present a "what is at stake" calculator to the user 290. Such a "what is at stake" calculator can illustrate, for example, the monetary difference between two Social Security election outcomes (e.g., in terms of expected values of lifetime family benefits) associated with two Social Security election strategies, or two Social Security election outcomes associated with a single Social Security election strategy being applied for two different age combinations. In some embodiments, the "what is at stake" calculator can present the monetary difference between the overall optimal election outcome and a specific election outcome associated with a given election strategy for a given age combination. In some embodiments, an efficiency index calculated as the ratio of the specific election outcome to the overall optimal election outcome can be presented. Thus, the "what is at stake" calculator can indicate to the user 290 the monetary difference between, for example, choosing a "good" election strategy and choosing a "bad" election strategy for the married couple. In some embodiments, the presentation module 230 can be configured to display (e.g., in the "what is it worth" calculator, in the "what is at stake" calculator) the monetary value associated with a Social Security election outcome in present value terms.

In some embodiments, for a given age combination at which the married couple anticipates to elect Social Security benefits, the comparison module 270 can identify the best election strategy and associated secondary age combination for that primary age combination. The comparison module 270 can further compare the resulting benefit outcome of that election strategy at that age combination to the overall optimal outcome over all age combinations by creating an efficiency index. The efficiency index is defined as the ratio of the expected benefits under the given age combination to the overall optimal outcome under all age combinations, and is expressed as a percentage. For example, the anticipated election age combination for a married couple is (70, 70). Based on such a combination of chosen election ages, the maximum expected lifetime family benefits that this married couple can receive is $695,625.39 by calculation. On the other hand, the overall optimal expected lifetime family benefits for this married couple, across all election strategies and over all age combinations, is $756,114.55 by calculation. Thus, the resulting efficiency index is 92% (i.e., the ratio of $695,625.39 to $756,114.55). That is, the anticipated election for the married couple is 92% efficient.

In some embodiments, a portion or all the functionalities of a module within the host device 200 can be performed by another module in the host device 200. For example, the functionalities of the AIME calculation module 240 and/or the PIA calculation module 250 can be included in and performed at the election strategy calculation module 220. For another example, a first portion of the functionalities of the comparison module 270 can be included in and performed at the election strategy calculation module 220, and a second portion of the functionalities of the comparison module 270 can be included in and performed at the presentation module 230.

Although each module shown in FIG. 2 is included in the host device 200, in some other embodiments, some of the modules can be hosted at a communication device (e.g., the communication devices 180 in FIG. 1) or some other device operatively coupled to the host device 200. For example, the input module 260 and the presentation module 230 can be hosted at the communication device. In such an example, the communication device can receive input values from the user 290, and then send the received values to the host device 200. The communication device can also receive the election outcomes from the host device 200 before presenting the outcomes to the user 290. For another example, the calculation modules (e.g., the election strategy calculation module 220, the AIME calculation module 240, the PIA calculation module 250, and/or the comparison module 270) can be hosted at a server device operatively coupled to the host device 200. In this example, the calculations can be performed at the server device, and the input data and results can be transmitted between the server device and the host device 200.

In some embodiments, one or more of communication devices (e.g., the communication devices 180 shown in FIG. 1) can be configured to perform one or more functions associated with the host device 120. For example, in some embodiments, at least a portion of the Social Security optimization system can be executed at a communication device operatively coupled to the host device 200. In some other embodiments, the entire Social Security optimization system can be executed at such a communication device. In such embodiments, a processor (e.g., the processor 152, 162 in FIG. 1) of the communication device can execute instructions associated with the Social Security optimization system stored local to the communication device in a memory (e.g., the memory 154, 164) of the communication device. In such embodiments, the communication device need not be in communication with the host device 120 to execute the Social Security optimization system.

FIG. 5 is a flow chart illustrating a method 500 of performing a Social Security optimization analysis, according to an embodiment. Such a method can be performed by a processor of a host device (e.g., the processor 122 of the host device 120 in FIG. 1) or a processor of a communication device (e.g., the processor 162 of the communication device 160 in FIG. 1). For example, a host device can have a non-transitory processor-readable medium, which can store code representing instructions to be executed by the processor of the host device. The stored code can comprise code to cause the processor to perform the following operations.

At 502, an input value can be received from a user at the host device. The input value can be associated with financial information of a married couple. In some embodiments, the input value can include historical earning information for the married couple. In some embodiments, the input value can include, for example, historical Social Security covered earnings, an expected inflation rate, an AWI growth rate, a life expectancy for at least one individual from the married couple, or a discount rate.

In the example of FIG. 2, the input module 260 within the host device 200 can be configured to receive input values from the user 290. The user 290 can be a representative of a married couple. The user 290 can be, for example, an individual from the married couple, a relative of the married couple, or a financial advisor hired by the married couple. The input values received from the user 290 can be associated with the married couple, such as, for example, historical Social Security covered earnings of the married couple, an expected inflation rate, an AWI growth rate, a life expectancy for one or both spouses from the married couple, a discount rate, etc. Some possible input values associated with the married couple are illustrated in the table 310 in FIG. 3.

At 504, an AIME value and a PIA value can be calculated, using the input value received from the user, for each individual from the married couple. In some embodiments, the AIME value can be first calculated for each individual from the married couple, and then the PIA value can be calculated for each individual from the married couple based on the resulting AIME value. In some embodiments, in calculating the PIA value for each individual from the married couple, the PIA value for that individual for each year in which the individual is eligible to receive Social Security benefits can be calculated.

In the example of FIG. 2, the AIME calculation module 240 can be configured to receive input values associated with the married couple from the input module 260 via signal 205. The AIME calculation module 240 can then be configured to calculate an AIME value for each individual from the married couple, and further send the resulting AIME value to the PIA calculation module 250 (via signal 211). The PIA calculation module 250 can be configured to receive input values associated with the married couple from the input module 260 via signal 206. Based on the input value received from the input module 260 and/or the AIME value received from the AIME calculation module 240, the PIA calculation module 250 can be configured to calculate a PIA value for each individual from the married couple for each year in which that individual is eligible to receive Social Security benefits. The PIA calculation module 250 can further be configured to send the resulting PIA values to the election strategy calculation module 220 via signal 208.

At 506, election strategies that are available for the married couple can be identified from a set of election strategies. In some embodiments, each election strategy available for the married couple can be identified. In other embodiments, a subset of the available election strategies can be identified. In some embodiments, one or a series of logical tests can be used to determine whether or not the married couple can use an election strategy from the set of election strategies based on data, information and/or calculated values associated with the married couple. Furthermore, in some embodiments, the age combinations (including primary and/or secondary age combinations) that are available for the married couple within each available election strategy can be determined from a set of age combinations. In some embodiments, the set of age combinations can include primary age combinations and/or secondary age combinations. In some embodiments, the primary age combinations can include each Social Security solo electable age for a first individual from the married couple paired with each Social Security solo electable age for a second individual from the married couple. The secondary age combinations can include, for example, other types of election ages at which an individual is eligible to receive auxiliary Social Security benefits, spousal benefits, and/or the like.

In the example of FIG. 2, the available election strategies from a set of election strategies for the married couple, as well as the available age combinations associated with each available age combination from a set of age combinations, can be determined at the election strategy calculation module 220 based on data, information and/or calculated values received from the input module 260 and/or the PIA calculation module 250. The set of election strategies can include, for example, strategies #1 to #9 described with respect to FIG. 2. The primary age combinations included in the set of age combinations can include, for example, each Social Security electable age of 62 to 70 for a first individual from the married couple paired with each Social Security electable age of 62 to 70 for a second individual from the married couple.

At 510, Social Security election outcomes can be calculated using each available election strategy from the set of election strategies for each available age combination (including primary combinations and/or secondary combinations) associated with that election strategy for the married couple. For each available election strategy and each available age combination associated with that election strategy, the set of Social Security election outcomes can be calculated using the PIA value for each individual from the married couple.

In some embodiments, in calculating each Social Security election outcome for the married couple, each component from a set of components of a total family benefit can be calculated using a present value function. Then, the set of components can be summed to determine the total family benefit for that Social Security election outcome. In some embodiments, the present value function can be, for example, a PVA function or a NPV function. Additionally, in some embodiments, a monetary difference between present values of two Social Security election outcomes can be calculated for the married couple. In some embodiments, an optimal election strategy from the set of election strategies can be determined for the married couple.

In the example of FIG. 2, the election strategy calculation module 220 can be configured to calculate a set of Social Security election outcomes based on the input values received from the input module 260 (via signal 202) and the PIA values received from the PIA calculation module 250 (via signal 208). In some embodiments, the set of Social Security election outcomes calculated at the election strategy calculation module 220 can include Social Security election outcomes for each available election strategy from the set of election strategies and for each available age combination associated with the election strategy.

In some embodiments, the election strategy calculation module 220 can be configured to calculate each component from a set of components of a total family benefit for a given election strategy and for a given age combination, using a present value function. The present value function can be, for example, a PVA function or a NPV function. The set of components can include, for example, components i) to vi) described with respect to FIG. 2. Then, the election strategy calculation module 220 can be configured to sum the set of components to determine the total family benefit for that Social Security election outcome. Additionally, in some embodiments, the comparison module 270 can be configured to calculate a monetary difference between present values of two Social Security election outcomes. The comparison module 270 can also be configured to determine an optimal election strategy from the set of election strategies for the married couple.

At 510, the set of Social Security election outcomes can be presented to the user. In some embodiments, the monetary difference calculated at step 508, a result associated with the optimal election strategy determined at step 508, and/or any other results can also be presented to the user. In the example of FIG. 2, the presentation module 230 can be configured to receive Social Security election outcomes, the calculated monetary difference, the determined optimal election strategy, and/or other results from the election strategy calculation module 220 via signal 203, and/or from the comparison module 270 via signal 210. The presentation module can then be configured to present those results to the user 290 via signal 204.

Figure 6:
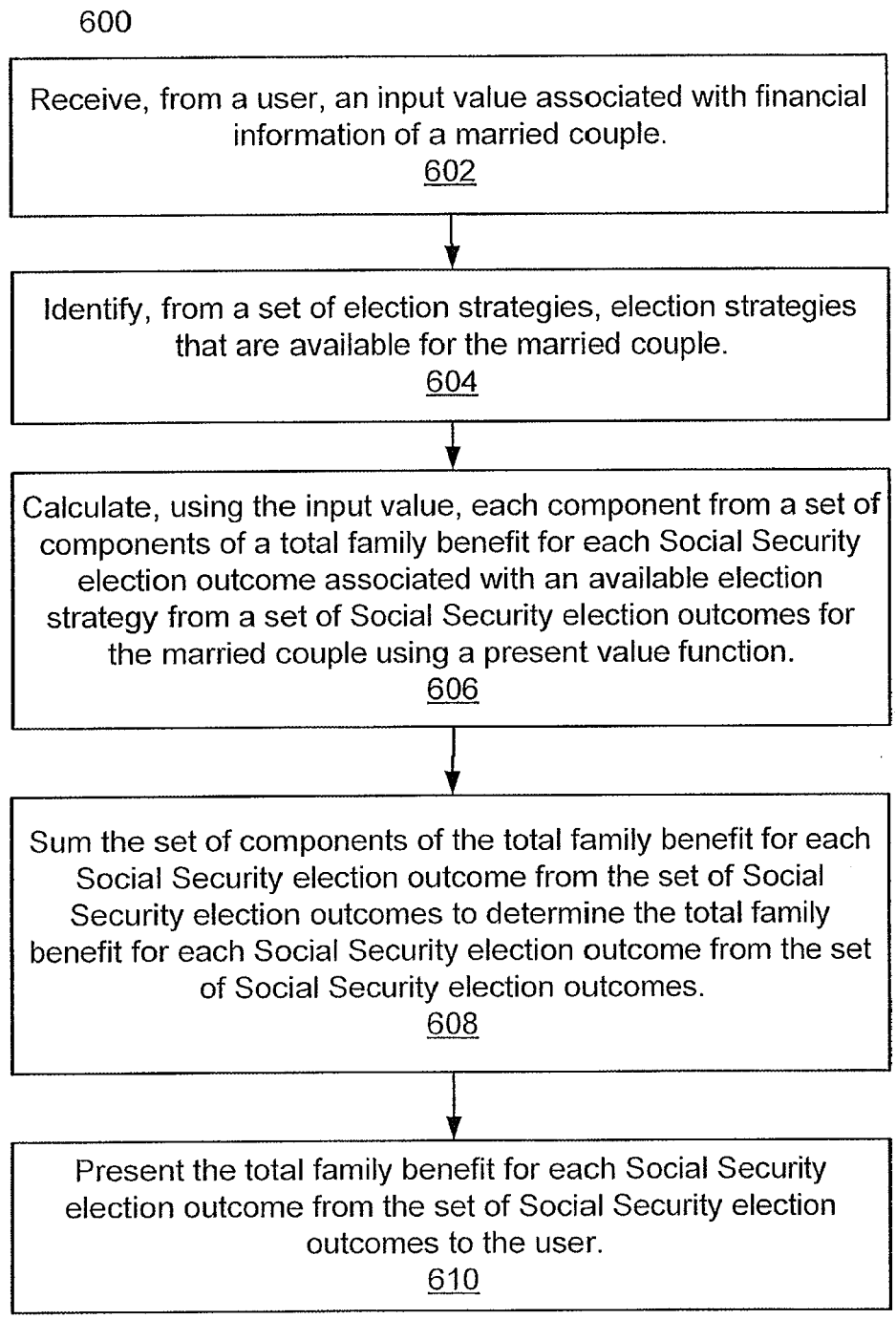
FIG. 6 is a flow chart illustrating a method of performing a Social Security optimization analysis, according to another embodiment.

FIG. 6 is a flow chart illustrating a method 600 of performing a Social Security optimization analysis, according to another embodiment. Such a method can be performed by a processor of a host device (e.g., the processor 122 of the host device 120 in FIG. 1) or a processor of a communication device (e.g., the processor 162 of the communication device 160 in FIG. 1). For example, a host device can have a non-transitory processor-readable medium, which can store code representing instructions to be executed by the processor of the host device. The stored code can comprise code to cause the processor to perform the following operations.

At 602, an input value can be received from a user at the host device. The input value can be associated with financial information of a married couple. In some embodiments, the input value can be, for example, historical Social Security covered earnings, an expected inflation rate, an AIME value, or a PIA value associated with an individual or both spouses of the married couple.

In the example of FIG. 2, the input module 260 within the host device 200 can be configured to receive input values from the user 290. The user 290 can be a representative of a married couple. The user 290 can be, for example, an individual from the married couple, a relative of the married couple, or a financial advisor hired by the married couple. The input values received from the user 290 can be associated with the married couple, such as, for example, historical Social Security covered earnings, an expected inflation rate, an AIME value, a PIA value, etc. Some possible input values associated with the married couple are illustrated in the table 310 in FIG. 3.

At 604, election strategies that are available for the married couple can be identified from a set of election strategies. In some embodiments, each election strategy available for the married couple can be identified. In other embodiments, a subset of the available election strategies can be identified. Furthermore, in some embodiments, the age combinations (including primary and/or secondary age combinations) available for the married couple within each available election strategy can be determined from a set of age combinations. In some embodiments, the set of age combinations can include primary age combinations and/or a secondary age combinations. In some embodiments, the primary age combinations can include each Social Security solo electable age for a first individual from the married couple paired with each Social Security solo electable age for a second individual from the married couple. The secondary age combinations can include, for example, other types of election ages at which an individual is eligible to receive auxiliary Social Security benefits, spousal benefits, and/or the like.

In the example of FIG. 2, the available election strategies from a set of election strategies for the married couple, as well as the available age combinations associated with each available age combination from a set of age combinations, can be determined at the election strategy calculation module 220 based on data, information and/or calculated values received from the input module 260 and/or the PIA calculation module 250. The set of election strategies can include, for example, strategies #1 to #9 described with respect to FIG. 2. The primary age combinations included in the set of age combinations can include, for example, each Social Security electable age of 62 to 70 for a first individual from the married couple paired with each Social Security electable age of 62 to 70 for a second individual from the married couple.

At 606, each component from a set of components of a total family benefit can be calculated, using the input value, for each Social Security election outcome associated with an available election strategy from a set of Social Security election outcomes for the married couple. The components can be calculated using a present value function. In some embodiments, the present value function can be, for example, a PVA function or a NPV function. In some embodiments, each component from the set of components can be calculated using at least the input value and/or a PIA value for each individual from the married couple. In some embodiments, the PIA value can be calculated, using the input value, for each individual from the married couple. Additionally, in some embodiments, the set of Social Security election outcomes can include a Social Security election outcome for each available election strategy from the set of election strategies for each associated available age combination from the set of age combinations for the married couple.

In the example of FIG. 2, the election strategy calculation module 220 can be configured to calculate each component from a set of components of a total family benefit for each Social Security election outcome associated with an available election strategy. The components can be calculated using a present value function. The present value function can be, for example, a PVA function or a NPV function. The set of components can include, for example, components i) to vi) described with respect to FIG. 2. In some embodiments, the AIME calculation module 240 can be configured to calculate an AIME value for each individual from the married couple using the input value. Similarly, the PIA calculation module 250 can be configured to calculate at least a PIA value for each individual from the married couple using the input value and the calculated AIME value. The election strategy calculation module 220 can then be configured to calculate each component from the set of components using at least the input value and/or the PIA value. In some embodiments, the set of Social Security election outcomes can include a Social Security election outcome for each available election strategy from the set of election strategies for each associated available age combination from the set of age combinations for the married couple.

At 608, the set of components of the total family benefit can be summed for each Social Security election outcome from the set of Social Security election outcomes to determine the total family benefit for each Social Security election outcome from the set of Social Security election outcomes. In the example of FIG. 2, the election strategy calculation module 220 can be configured to sum the set of components to determine the total family benefit for each Social Security election outcome. Thus, the total family benefit for each Social Security election outcome from the set of Social Security election outcomes can be determined at the election strategy calculation module 220.

At 610, the total family benefit for at least one Social Security election outcome from the set of Social Security election outcomes can be presented to the user. In the example of FIG. 2, the presentation module 230 can be configured to receive the total family benefit for at least one Social Security election outcome, and then present the received total family benefit for the Social Security election outcome to the user 290 via signal 204.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:

receive, from a user, an input of a plurality of values associated with financial information of a married couple;

calculate, using the plurality of values, an average indexed monthly earnings (AIME) value and a primary insurance amount (PIA) value for each individual from the married couple;

calculate, using at least one of the AIME value or the PIA value for each individual from the married couple, a plurality of Social Security election outcomes using each election strategy from a plurality of election strategies for each primary age combination from a plurality of primary age combinations paired with each secondary age combination from a plurality of secondary age combinations for the married couple, each secondary age combination from the plurality of secondary age combinations including at least one of an election age for auxiliary Social Security benefits, an election age for spousal Social Security benefits, an election age to receive Social Security benefits as a child, or an election age to receive Social Security benefits as a widow;

select, from the plurality of Social Security election outcomes and for each primary age combination from the plurality of primary age combinations, an optimal result and an election strategy used to calculate the optimal result for that primary age combination; and present the optimal result for each primary age combination from the plurality of primary age combinations to the user in a selectable user-interface grid such that the user can view, for each primary age combination from the plurality of primary age combinations, (1) a secondary age combination from the plurality of secondary age combinations and associated with the optimal result for that primary age combination and (2) the election strategy used to calculate the optimal result for that primary age combination.

2. The non-transitory processor-readable medium of claim 1, wherein the plurality of primary age combinations includes each Social Security primary electable age for a first individual from the married couple paired with each Social Security primary electable age for a second individual from the married couple.

3. The non-transitory processor-readable medium of claim 1, wherein the plurality of values associated with financial information of the married couple includes historical earning information for the married couple.

4. The non-transitory processor-readable medium of claim 1, further comprising code to cause the processor to:
calculate a monetary difference between a present value of a first Social Security election outcome from the plurality of Social Security election outcomes and a present value of a second Social Security election outcome from the plurality of Social Security election outcomes; and
present the monetary difference to the user.

5. The non-transitory processor-readable medium of claim 1, wherein the code to cause the processor to calculate the plurality of Social Security election outcomes includes code to cause the processor to calculate each Social Security election outcome from the plurality of Social Security election outcomes by calculating each component from a plurality of components of a total family benefit using one of a present value of an annuity (PVA) function or a net present value (NPV) function, and summing the plurality of components to determine the total family benefit for that Social Security election outcome.

6. The non-transitory processor-readable medium of claim 1, wherein the plurality of values associated with financial information of the married couple includes at least one of historical Social Security covered earnings, an expected inflation rate, an average wage index (AWI) growth rate, a life expectancy for at least one individual from the married couple, or a discount rate.

7. The non-transitory processor-readable medium of claim 1, wherein the code to cause the processor to calculate the PIA value includes code to calculate the PIA value for an individual from the married couple for each year in which that individual is eligible to receive Social Security benefits.

8. The non-transitory processor-readable medium of claim 1, wherein the plurality of primary age combinations includes at least one of every possible whole-year primary age combination or every possible monthly primary age combination.

9. The non-transitory processor-readable medium of claim 1, wherein the code to cause the processor to select includes code to cause the processor to select the optimal result for each primary age combination from the plurality of primary age combinations based on a maximum total lifetime benefit for each election strategy from the plurality of election strategies for that primary age combination from the plurality of primary age combinations.

10. The non-transitory processor-readable medium of claim 1, further comprising code to cause the processor to:
define an efficiency index as a ratio of the optimal result for a first primary age combination from the plurality of primary age combinations over an optimal result for a second primary age combination from the plurality of primary age combinations, the optimal result for the second primary age combination being greater than the optimal result for any remaining primary age combination from the plurality of primary age combinations; and
present the efficiency index to the user.

11. An apparatus, comprising:
an input module implemented in at least one of a memory or a processing device, the input module configured to receive, from a user, an input of a plurality of values associated with financial information of a married couple;
an election strategy calculation module operatively coupled to the input module and configured to calculate a plurality of Social Security election outcomes using each election strategy from a plurality of election strategies for each primary age combination from a plurality of primary age combinations paired with each secondary age combination from a plurality of secondary age combinations for the married couple using at least one of the plurality of values, an average indexed monthly earnings (AIME) value, or a primary insurance amount (PIA) value, the election strategy calculation module configured to select, from the plurality of Social Security election outcomes and for each primary age combination from the plurality of primary age combinations, an optimal result and an election strategy used to calculate the optimal result for that primary age combination,
each secondary age combination from the plurality of secondary age combinations including at least one of an election age for auxiliary Social Security benefits, an election age for spousal Social Security benefits, an election age to receive Social Security benefits as a child, or an election age to receive Social Security benefits as a widow,
the plurality of primary age combinations including each Social Security primary electable age for a first individual from the married couple paired with each Social Security primary electable age for a second individual from the married couple; and
a presentation module operatively coupled to the election strategy calculation module and configured to present the optimal result for each primary age combination from the plurality of primary age combinations to the user in a selectable user-interface grid such that the user can view, for each primary age combination from the plurality of primary age combinations, (1) a secondary age combination from the plurality of secondary age combinations and associated with the optimal result for that primary age combination and (2) the election strategy used to calculate the optimal result for that primary age combination.

12. The apparatus of claim 11, further comprising:
an AIME calculation module configured to calculate the AIME value based on at least one value from the plurality of values associated with the financial information of the married couple; and
a PIA calculation module configured to calculate the PIA value based on the at least one value from the plurality of values associated with the financial information of the married couple.

13. The apparatus of claim 11, wherein the input module is configured to receive, from the user, an input of at least one of the AIME value or the PIA value.

14. The apparatus of claim 11, further comprising:
a comparison module configured to calculate a monetary difference between a present value of a first Social Security election outcome from the plurality of Social Security election outcomes and a present value of a second Social Security election outcome from the plurality of Social Security election outcomes,
the presentation module configured to present the monetary difference to the user.

15. The apparatus of claim 11, wherein the election strategy calculation module is configured to select, from the plurality of election strategies, an optimal election strategy, the presentation module configured to present a result associated with the optimal election strategy to the user.

16. The apparatus of claim 11, further comprising:
a PIA calculation module configured to calculate the PIA value for an individual from the married couple for each year in which that individual is eligible to receive Social Security benefits using at least one value from the plurality of values associated with the financial information of the married couple.

17. An apparatus, comprising:
an input module implemented in at least one of a memory or a processing device, the input module configured to receive, from a user, an input of a plurality of values associated with financial information of a married couple;
an election strategy calculation module operatively coupled to the input module and configured to calculate a plurality of Social Security election outcomes using each election strategy from a plurality of election strategies for each primary age combination from a plurality of primary age combinations paired with each secondary age combination from a plurality of secondary age combinations for the married couple using at least one of the plurality of values, an average indexed monthly earnings (AIME) value, or a primary insurance amount (PIA) value, each secondary age combination from the plurality of secondary age combinations including at least one of an election age for auxiliary Social Security benefits, an election age for spousal Social Security benefits, an election age to receive Social Security benefits as a child, or an election age to receive Social Security benefits as a widow,
the election strategy calculation module configured to select, from the plurality of Social Security election outcomes, an optimal Social Security election outcome;
a presentation module operatively coupled to the election strategy calculation module and configured to present a set of Social Security election outcomes from the plurality of Social Security election outcomes in a selectable user-interface grid; and
a comparison module operatively coupled to the presentation module and configured to calculate a monetary difference between a present value of the optimal Social Security election outcome and a present value of a Social Security election outcome selected by the user on the selectable user-interface grid and from the set of Social Security election outcomes,
the presentation module configured to present the monetary difference to the user.

18. The apparatus of claim 17, further comprising:
an AIME calculation module configured to calculate the AIME value based on at least one value from the plurality of values associated with the financial information of the married couple; and
a PIA calculation module configured to calculate the PIA value based on at least one value from the plurality of values associated with the financial information of the married couple.

19. The apparatus of claim 17, wherein the input module is configured to receive, from the user, an input of at least one of the AIME value or the PIA value.

20. The apparatus of claim 17, wherein the plurality of primary age combinations includes each Social Security primary electable age for a first individual from the married couple paired with each Social Security primary electable age for a second individual from the married couple.

21. The apparatus of claim 17, further comprising:
a PIA calculation module configured to calculate the PIA value for an individual from the married couple for each year in which that individual is eligible to receive Social Security benefits using at least one value from the plurality of values associated with the financial information of the married couple.

22. The apparatus of claim 17, wherein the plurality of values associated with financial information of the married couple includes at least one of historical Social Security covered earnings, an expected inflation rate, an average wage index (AWI) growth rate, a life expectancy for at least one individual from the married couple, or a discount rate.

23. The apparatus of claim 17, wherein the presentation module is configured to present to the user an identifier associated with an election strategy from the plurality of election strategies and used to calculate the optimal Social Security election outcome.

* * * * *